United States Patent
Atreya et al.

(10) Patent No.: US 8,231,774 B2
(45) Date of Patent: Jul. 31, 2012

(54) THERMAL MANAGEMENT OF A HIGH TEMPERATURE FUEL CELL ELECTROLYZER

(75) Inventors: Shailesh Atreya, Irvine, CA (US); Marianne E. Mata, Dana Point, CA (US); Chellappa Balan, Niskayuna, NY (US)

(73) Assignee: The Boeing Company, Chicago, IL (US)

( * ) Notice: Subject to any disclaimer, the term of this patent is extended or adjusted under 35 U.S.C. 154(b) by 705 days.

(21) Appl. No.: 12/401,278

(22) Filed: Mar. 10, 2009

(65) Prior Publication Data

US 2009/0263681 A1 Oct. 22, 2009

Related U.S. Application Data

(60) Provisional application No. 61/046,054, filed on Apr. 18, 2008.

(51) Int. Cl.
*C25B 1/06* (2006.01)
*C25B 1/04* (2006.01)

(52) U.S. Cl. .................................................. 205/637

(58) Field of Classification Search ................... None
See application file for complete search history.

(56) References Cited

U.S. PATENT DOCUMENTS

2005/0048334 A1* 3/2005 Sridhar et al. .................. 429/21
2007/0119718 A1* 5/2007 Gibson et al. ................. 205/637

* cited by examiner

*Primary Examiner* — Patrick Ryan
*Assistant Examiner* — Wyatt McConnell
(74) *Attorney, Agent, or Firm* — Hope Baldauff Hartman, LLC

(57) ABSTRACT

Apparatus, systems, and methods provide for the management of a high temperature electrolysis process. According to embodiments described herein, a fuel cell electrolyzer stack is utilized in an electrolysis process. One implementation includes the use of a solid oxide electrolyzer. Input voltage is cycled around a thermal neutral voltage such that the fuel cell electrolyzer stack cycles between operation in an exothermic mode and an endothermic mode. The waste heat generated by operation in the exothermic mode is used to support the endothermic operation. By cycling between operation modes, the temperature of the fuel cell electrolyzer stack may be controlled without the use of a cooling loop or recirculated reactant flow, and the efficiency of the electrolysis process is maximized.

20 Claims, 4 Drawing Sheets

THERMAL MANAGEMENT OF A HIGH TEMPERATURE FUEL CELL ELECTROLYZER

CROSS-REFERENCE TO RELATED APPLICATIONS

This application claims the benefit of U.S. Provisional Patent Application No. 61/046,054, filed on Apr. 18, 2008, and entitled "Thermal Management of a High Temperature Fuel Cell Electrolyzer," which is expressly incorporated herein by reference in its entirety.

BACKGROUND

A fuel cell electrolyzer is a device that operates in one direction as a fuel cell and in an opposite direction as an electrolyzer. A fuel cell uses a fuel and an oxidant separated by an electrolyte to produce electricity, while an electrolyzer utilizes input voltage across an electrolyte to separate a chemically bonded compound. Fuel cell electrolyzers may be used to produce and store energy. For example, the electrolysis of water may be used to create hydrogen and oxygen for storage. The hydrogen and oxygen may then be used as reactants to produce electricity.

Fuel cell electrolyzers require thermal management in order to maintain desired performance and avoid damage to the cell. As an example, a solid oxide electrolyzer (SOEL) may operate in endothermic or exothermic mode. In endothermic mode, the SOEL operation requires less electricity to drive the production of hydrogen and oxygen, but an external heat source is required to maintain the temperature and a stable reaction. In exothermic mode, the reaction is stable and self-sustaining, but the SOEL produces heat as a waste product, which decreases the efficiency of the reaction. The waste heat must be removed since continued exothermic operation without cooling will increase the cell temperature until the SOEL fails. Conventionally, the waste heat is removed through the use of a thermal management system.

Typical thermal management systems can include active or passive cooling loops such as a pulsating heat pipe within the electrolyzer system, or a recirculating reactant flow through the cell to remove excess heat. In either case, typical thermal management systems add hardware to the electrolysis process, which can impact overall system efficiency, reliability, power consumption, and weight. When fuel cell electrolyzers are used in certain applications such as to provide power to an airborne vehicle or vehicle system, efficiency, reliability, power consumption, and weight are primary considerations.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Apparatus, systems, and methods described herein provide for the management of an electrolysis process and to control the operating temperature of an electrolyzer cell. According to one aspect of the disclosure provided herein, the temperature of an electrolyzer cell is monitored. When the temperature reaches a predetermined upper temperature threshold, then the voltage supplied to the electrolyzer cell is decreased to a level lower than the thermal neutral voltage of the electrolyzer cell so that the cell operates in an endothermic mode. Once the temperature drops to a predetermined lower temperature threshold, the voltage to the electrolyzer cell is increased above the thermal neutral voltage so that the electrolyzer cell shifts operation mode from the endothermic mode to an exothermic mode.

According to another aspect, a thermal control system for managing heat within a high temperature electrolyzer includes a temperature sensor and a controller. The controller ensures application of correct voltage to the high temperature electrolyzer and monitors the temperature of the electrolyzer using the temperature sensor. The controller varies the voltage above and below the thermal neutral voltage when the temperature approaches lower and upper temperature thresholds, respectively to control the temperature of the high temperature electrolyzer.

The features, functions, and advantages that have been discussed can be achieved independently in various embodiments of the present invention or may be combined in yet other embodiments, further details of which can be seen with reference to the following description and drawings.

DETAILED DESCRIPTION

Figure 1:
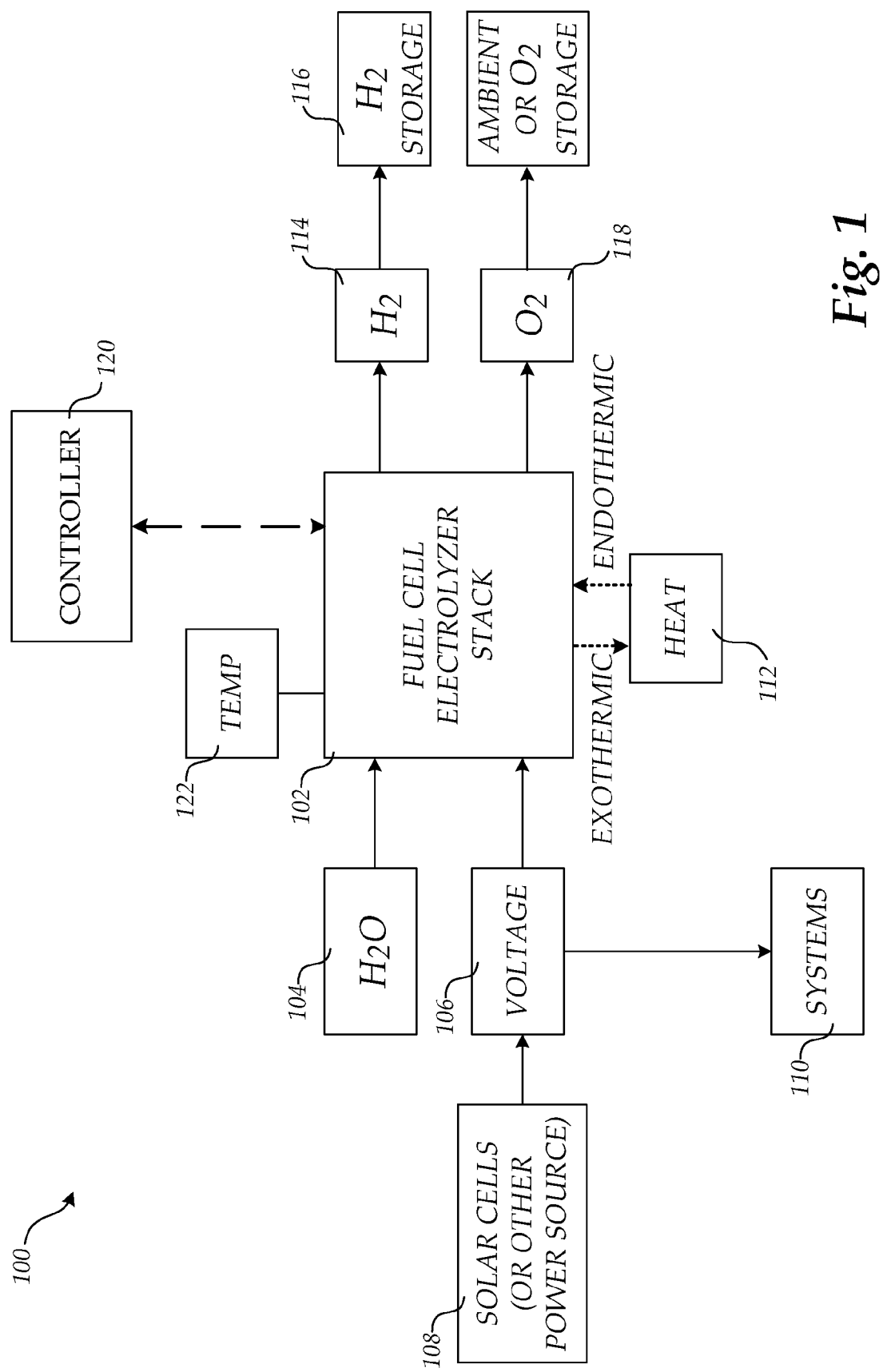
FIG. 1 is a block diagram showing a fuel cell electrolyzer system configured for electrolysis according to various embodiments presented herein.

The following detailed description is directed to apparatus, systems, and methods for controlling an electrolysis process and to manage the operating temperature of an electrolyzer cell. As discussed briefly above, the manner in which heat within an electrolysis process is managed influences the efficiency and weight of the overall electrolysis system. Maximizing efficiency and minimizing weight of an electrolysis system is more desirable in some applications than others. For example, when a SOEL is used in an aerospace platform, platform design specifications dictate that the SOEL and corresponding reactants and components conform to very specific power, space, and weight parameters.

Throughout this disclosure, the various embodiments will be described with respect to the operation of a high temperature electrolyzer, such as a SOEL, used in the electrolysis of water to create hydrogen and oxygen. However, it should be understood that the disclosure provided herein is equally applicable to any type of electrolyzer that can operate both endothermically and exothermically used to separate any chemically bonded compound where external thermal management systems such as cooling loops and recirculating reactant flows are not optimum due to application constraints or other operational considerations.

In some conventional systems in which a high temperature electrolyzer generates hydrogen and oxygen under pressure, only hydrogen is stored under pressure and the oxygen is vented to the lower pressure ambient air. On an aircraft, venting oxygen instead of storing it reduces the weight required by the system since oxygen storage equipment is not utilized. However, the variation in pressure between the high pressure hydrogen and lower ambient pressure oxygen typically requires one of a couple electrolyzer design solutions. First, the electrolyzer stack and the electrolyte in the cell may be designed to withstand the pressure differential between the hydrogen and the oxygen by increasing the cell thickness and the electrolyte thickness. Ambient airflow may then be added to the system to remove heat from the cell. However, the thicker electrolyte results in an increased area specific resistance of the cell, which degrades cell performance and lowers overall power system performance. Moreover, the increased cell thickness adds additional weight to the power system.

A second design solution includes controlling the oxygen side pressure using backpressure regulation components in order to more closely match the hydrogen side pressure and to introduce a small differential pressure between the hydrogen and oxygen sides of the electrolyzer cell. Doing so allows for a thinner electrolyte to be used to maintain a higher cell performance, but does not allow for a sufficient reactant flow to remove the waste heat from the stack. Consequently, to cool the stack, additional reactant flow with recirculation would be required, or an additional imbedded coolant loop, to sufficiently cool the electrolyzer cell. As mentioned above, adding these additional thermal management systems can undesirably impact overall system efficiency, reliability, power consumption, and weight.

Utilizing the concepts and technologies described herein, a high temperature electrolyzer system may be operated in a manner that allows for thermal control of the stack, without requiring a thicker electrolyte or an additional cooling loop or other thermal management system that would negatively impact the performance of the electrolyzer system or exceed the often stringent power, space, and weight parameters of a vehicle platform. In the following detailed description, references are made to the accompanying drawings that form a part hereof, and which are shown by way of illustration, specific embodiments, or examples. Referring now to the drawings, in which like numerals represent like elements through the several figures, thermal management of a high temperature electrolyzer system will be described.

FIG. 1 shows a high temperature electrolyzer system 100 according to one embodiment described herein. The high temperature electrolyzer system 100 includes a fuel cell electrolyzer stack 102 that is operated to split water 104 into hydrogen 114 and oxygen 118. To enable the electrolysis process, a voltage 106 is supplied to the fuel cell electrolyzer stack 102. This voltage 106 may originate from any type of power supply. According to one implementation, the voltage 106 is supplied by solar cells 108. The solar cells 108 may be a primary source of electrical power for an aircraft or other vehicle during the day, supplying voltage 106 to any number of aircraft systems 110 and surplus voltage to the fuel cell electrolyzer stack 102 for the creation of hydrogen 114 to be used as a fuel for the creation of electricity during night operations. It should be noted that this method of thermal control of the electrolyzer cell can also be used in applications other than airborne vehicles, such as ground distributed regenerative power systems, to increase overall system efficiency.

As described above, the fuel cell electrolyzer stack 102 may operate in either endothermic mode or exothermic mode. In endothermic mode, the electrolyzer electrochemical reaction requires heat 112 for stable operation which is supplied to the fuel cell electrolyzer stack 102. Energy in the form of voltage 106, or a combination of heat 112 and voltage 106, may be utilized by the fuel cell electrolyzer stack 102 in the electrolysis process to split water 104 into hydrogen 114 and oxygen 118. In exothermic mode, the heat 112 is a product of the electrolysis process and must be removed or otherwise managed to avoid over temperature and subsequent failure of the fuel cell electrolyzer stack 102.

The embodiments described herein utilize precise control of the voltage 106 and the heat 112 to cycle the electrolysis process between the endothermic and exothermic modes to increase the electrical efficiency and thermally control the fuel cell electrolyzer stack 102 without adding weight to the high temperature electrolyzer system 100. A controller 120 closely monitors the temperature of the fuel cell electrolyzer stack 102 using a temperature sensor 122 and adjusts the voltage 106 to initiate operation within the endothermic or exothermic modes accordingly. Thermal energy storage may be further increased by integrating a thermal storage device, such as additional or phase change material, into the fuel cell electrolyzer stack.

Although the controller 120 is shown to be directly connected to the fuel cell electrolyzer stack 102, it should be appreciated that the controller 120 may be communicatively connected to any or all of the components of the high temperature electrolyzer system 100. The controller 120 is operative to control the flow of water 104 and voltage 106 into the fuel cell electrolyzer stack 102. The controller 120 may include, or operate in conjunction with, any type of computing device having a processor, memory, and/or computer-readable media for storing computer executable instructions for controlling the high temperature electrolyzer system 100 in the various manners described herein. The thermal management functionality of the controller 120 will be described in greater detail below with respect to FIG. 3 and FIG. 4.

According to various embodiments, the hydrogen 114 produced by the electrolysis process is stored at high pressure in hydrogen storage 116, while the oxygen 118 produced is vented to the ambient atmosphere. As discussed above, doing so saves weight and reduces the footprint of the overall high temperature electrolyzer system 100 since oxygen storage equipment is not utilized. It also makes it possible to use a thinner electrolyte for the fuel cell electrolyzer stack and control the oxygen side pressure using backpressure regulation components. Instead of utilizing an additional cooling loop, the thermal properties and cooling of the cell is accomplished by manipulating the exothermic/endothermic operation of the cell. However, it should be appreciated that the oxygen 118 may also be stored without departing from the scope of this disclosure when weight and space limitations are not a concern.

Figure 2:
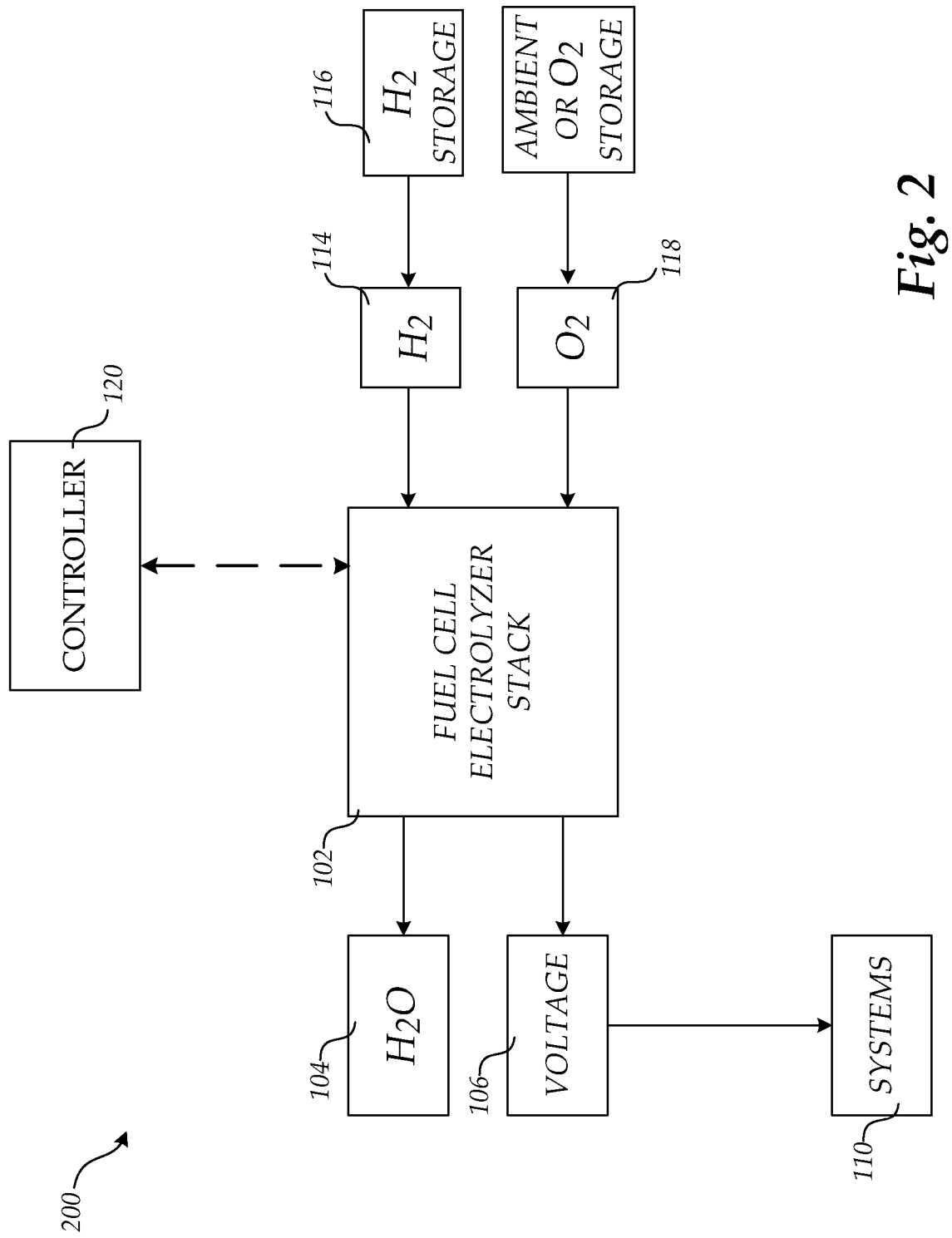
FIG. 2 is a block diagram showing a fuel cell electrolyzer system configured as a fuel cell to produce electricity according to various embodiments presented herein.

FIG. 2 shows a fuel cell system 200 in which the fuel cell electrolyzer stack 102 is configured for the production of voltage 106 according to one embodiment described herein. The fuel cell system 200 may utilize the same components of the high temperature electrolyzer system 100 shown in FIG. 1 and described above. However, the operation of the fuel cell system 200 runs electrochemically in reverse as compared to the high temperature electrolyzer system 100. It should be understood that the embodiments described herein may alternatively utilize any number of separate electrolyzer and fuel cell units rather than the fuel cell electrolyzer stack 102 shown in FIG. 1 and FIG. 2.

According to the embodiment shown in FIG. 2, high pressure hydrogen 114 is routed from the hydrogen storage 116 to the fuel cell electrolyzer stack 102 to be combined with oxygen 118 to create water 104 and the voltage 106 required to operate the aircraft systems 110 or other vehicle systems. It should be appreciated that while FIG. 1 and FIG. 2 both describe a fuel cell electrolyzer stack 102, the fuel cell and electrolyzer functions can alternatively be supported by separate discrete units if desired. A separate cell stack that operates in electrolyzer mode only would also be able to use the endothermic/exothermic methodology and design described herein for advantageous cooling of the electrolyzer stack.

FIG. 2 shows the high temperature electrolyzer system 100 shown in FIG. 1 when used in a fuel cell operational mode. An example application of this type of fuel cell electrolyzer operation would be a solar powered vehicle, where solar power may be used to generate power during the daytime. Excess power is used to generate hydrogen with the system operating in electrolysis mode without the excess weight of an external thermal management system according to the disclosure presented herein. The hydrogen generated by electrolysis may then be provided back to the fuel cell electrolyzer stack 102 during nighttime operations in order to generate the power required to operate the vehicle systems when solar power is not available. This type of fuel cell electrolyzer operation is equally applicable to other types of renewable energy sources in addition to solar power, such as wind power.

As stated previously, the fuel cell power generation cell stack and the electrolyzer hydrogen and oxygen production stack may be the same unit operating in reverse electrical operation or two separate units. It should be appreciated that to assist in controlling the transition between the operational pressures within the fuel cell electrolyzer stack 102 when transitioning between fuel cell and electrolyzer operation, the electrochemical production or consumption rate of oxygen 118 may be controlled as well as the backpressure of the oxygen 118, or air containing the oxygen 118, within the fuel cell electrolyzer stack 102.

Figure 3:
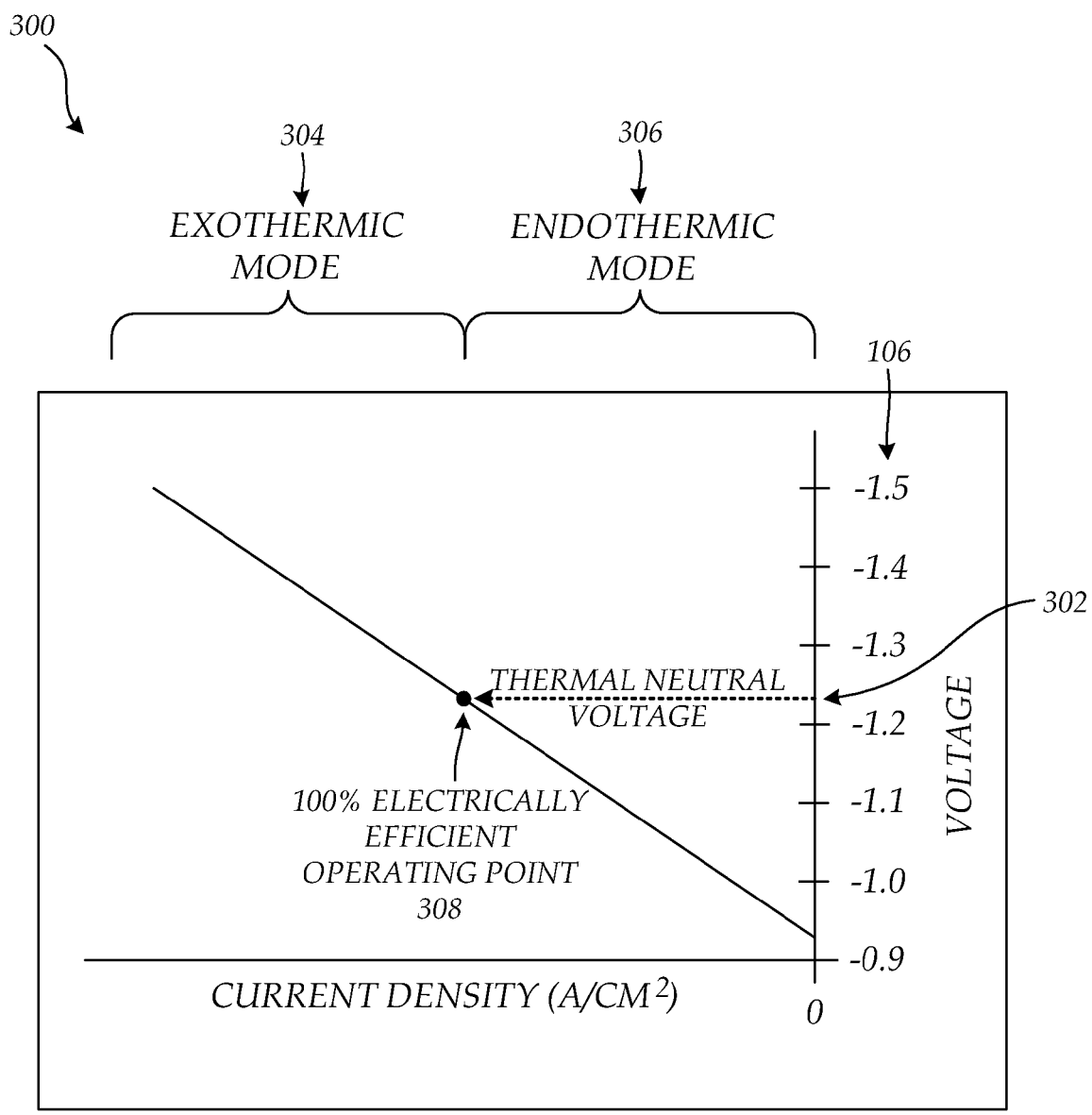
FIG. 3 is diagram showing an illustrative polarization curve corresponding to a fuel cell electrolyzer system at an example operating point according to various embodiments presented herein.

FIG. 3 shows an example of a polarization curve 300 corresponding to the high temperature electrolyzer system 100 according to one embodiment described herein. The polarization curve 300 plots the voltage input versus the current density associated with a SOEL. It should be understood that the actual values shown in FIG. 3 are merely illustrative and would vary depending on the characteristics of the SOEL being used within the fuel cell electrolyzer stack 102 and of the various components of the high temperature electrolyzer system 100. The polarization curve 300 illustrates the concepts of the various embodiments described herein with respect to the effect of varying the voltage 106 above and below a thermal neutral voltage 302 in order to change the operation of the corresponding fuel cell electrolyzer stack 102 operating in electrolysis mode between an exothermic mode 304 and an endothermic mode 306.

SOELs can perform over a wide current density and voltage range. In an ideal operating environment, the SOEL would operate at 100% electrical efficiency, which occurs at the 100% electrical efficient operating point 308 shown on the polarization curve 300. Various operational characteristics affect the specific 100% electrical efficient operating point 308 for a given application. Example characteristics include but are not limited to temperature, flow rates, reactants, available heat, input voltage 106, and the size of the fuel cell electrolyzer stack 102.

During operation of the high temperature electrolyzer system 100, the thermal neutral voltage 302 is the voltage 106 at which the reaction within the fuel cell electrolyzer stack 102 changes between exothermic mode 304 and endothermic mode 306. For example, FIG. 3 shows that increasing the voltage 106 input into the fuel cell electrolyzer stack 102 during electrolysis from 1.1V to 1.4V will switch the operation of the fuel cell electrolyzer stack 102 from the endothermic mode 306 to the exothermic mode 304, since the voltage was increased past the thermal neutral voltage 302 of approximately 1.23V. Therefore, it can be seen that by cycling the voltage 106 around the thermal neutral voltage 302, the operation of the fuel cell electrolyzer stack 102 can be cycled between the endothermic mode 306 and the exothermic mode 304.

It should be noted that as the operating point corresponding to the fuel cell electrolyzer stack 102 moves farther away from the 100% electrically efficient operating point 308 into the exothermic mode 304, the electrical efficiency of the high temperature electrolyzer system 100 decreases due to the increase in cell losses which increase the amount of waste heat 112. Conversely, as the operating point of the fuel cell electrolyzer stack 102 moves away from the 100% electrically efficient operating point 308 farther into the endothermic mode 306, system electrical efficiency increases to a value greater than 100% since the stored heat is now being used to supplement the electrolysis reaction with lower voltage 106 input into the system.

By precisely controlling the operation of the high temperature electrolyzer system 100, so that the fuel cell electrolyzer stack 102 operates in the exothermic mode 304 for a duration of time until the temperature of the fuel cell electrolyzer stack 102 reaches a predetermined threshold level, and then switching to endothermic mode 306 to cool the fuel cell electrolyzer stack 102 and use the excess heat 112 to support the endothermic reaction and increase total system efficiency, the overall efficiency of the high temperature electrolyzer system 100 can be increased as compared to a purely exothermic system. Moreover, the temperature of the fuel cell electrolyzer stack 102 can be managed in this manner without the use of an external thermal control system.

According to one embodiment, the voltage 106 input into the fuel cell electrolyzer stack 102 would include minimum and maximum values, below and above the thermal neutral voltage 302, the mean of which would approximately equate to the thermal neutral voltage 302. In other words, the controller 120 cycles the voltage 106 around the thermal neutral voltage 302 so that the average voltage 106 input into the fuel cell electrolyzer stack 102 is as close as possible to the thermal neutral voltage 302. Doing so not only operates the high temperature electrolyzer system 100 at overall efficiencies approaching the 100% electrical efficient operating point 308, but ensures that additional heat beyond that generated 112 is not required to sustain operation of the fuel cell electrolyzer stack 102 and that excess heat 112 is not present in sufficient quantities as to require an external thermal management system. In other words, operation of the fuel cell electrolyzer stack 102 with an average input voltage 106 approximately equivalent to the thermal neutral voltage 302 creates the waste heat 112 during operation in the exothermic mode 304 that is of sufficient quantity to sustain operation of the fuel cell electrolyzer stack 102 in the endothermic mode 306.

The cycle time, or the time operating the fuel cell electrolyzer stack 102 in the exothermic mode 304 from a predetermined upper temperature threshold to a lower temperature threshold in the endothermic mode 306 and back to the upper temperature threshold, depends on the predetermined upper and lower threshold temperatures and the thermal heat capacity of the fuel cell electrolyzer stack 102. A lower heat capacity would result in a shorter cycle time since the amount of heat 112 able to be stored between the upper and lower threshold temperatures would be less. Lowering the threshold temperature differential between the upper and lower threshold temperatures would also result in a shorter cycle time. A larger heat capacity would result in a longer cycle time since the amount of heat 112 able to be stored between the upper and lower threshold temperatures would be more. Increasing the temperature differential between the upper and lower threshold temperatures would also allow longer times within the exothermic mode 304 and the endothermic mode 306. The upper and lower threshold temperatures are predetermined according to the design characteristics, such as heat capacity and thermal distribution, corresponding to the fuel cell electrolyzer stack 102.

Figure 4:
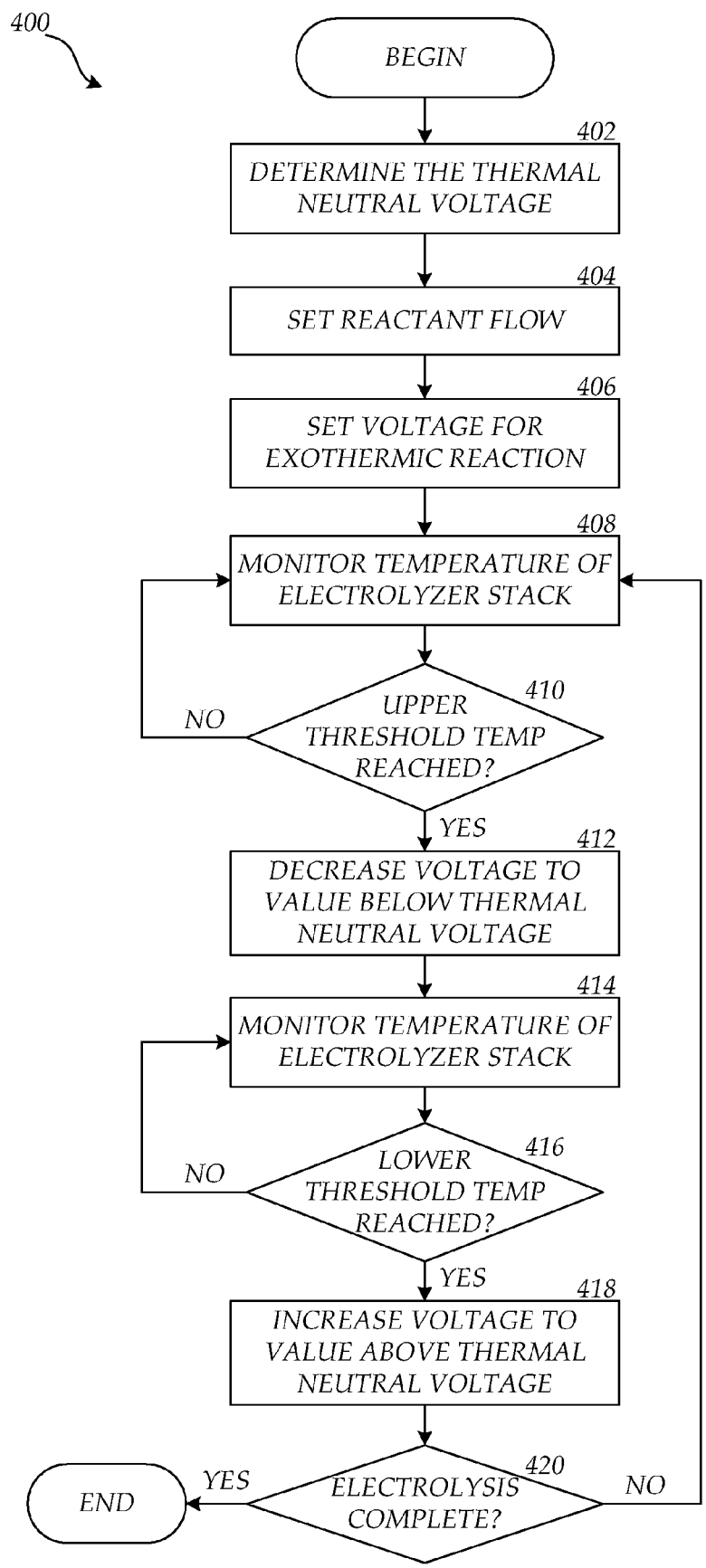
FIG. 4 is a flow diagram illustrating a method for controlling the temperature of a high temperature fuel cell electrolyzer according to various embodiments presented herein.

Turning now to FIG. 4, an illustrative routine 400 for controlling an electrolysis process within a fuel cell electrolyzer stack 102 will now be described in detail. It should be appreciated that more or fewer operations may be performed than shown in the FIG. 4 and described herein. Moreover, these operations may also be performed in a different order than those described herein. The routine 400 begins at operation 402, where the controller 120 determines the thermal neutral voltage 302.

This determination as to the voltage 106 at which the reaction within the fuel cell electrolyzer stack 102 switches between exothermic mode 304 and endothermic mode 306 depends upon the SOEL, the reactants, reactant flow rates, heat 112, among other characteristics. The controller 120 may determine the thermal neutral voltage 302 in real time according to changes to any of the applicable characteristics, or may be preprogrammed with a thermal neutral voltage 302 estimated according to the design of the high temperature electrolyzer system 100.

From operation 402, the routine 400 continues to operation 404, where the controller 120 sets the reactant flow into the fuel cell electrolyzer stack 102. As described above, the controller 120 may control the flow of water 104 or any other reactant into the fuel cell electrolyzer stack 102. According to various embodiments, the controller 120 may control this flow at any time during the electrolysis process to affect the cycle between the exothermic mode 304 and endothermic mode 306. From operation 404, the routine 400 continues to operation 406, where the controller 120 sets the voltage 106 to create an exothermic reaction. This voltage 106 may correspond to the voltage 106 required to reach the upper threshold temperature of the fuel cell electrolyzer stack 102 according to the desired cycle time. The routine continues to operation 408, where the controller 120 monitors the temperature of the fuel cell electrolyzer stack 102 using the temperature sensor 122.

At operation 410, the controller 120 determines whether the upper threshold temperature has been reached. If not, then the routine 400 returns to operation 408 and continues to monitor the fuel cell electrolyzer stack 102 temperature. However, if the upper threshold temperature has been reached, then the routine 400 continues to operation 412, where the controller 120 decreases the voltage 106 to a value below that of the thermal neutral voltage 302. The value may correspond to a voltage 106 that will enable the temperature of the fuel cell electrolyzer stack 102 to reach the lower threshold temperature according to the desired cycle time.

From operation 412, the routine 400 continues to operation 414, where the controller 120 again monitors the temperature of the fuel cell electrolyzer stack 102 as the temperature decreases and the fuel cell electrolyzer stack 102 switches from operation in exothermic mode 304 to operation in endothermic mode 306. At operation 416, the controller 120 determines whether the lower threshold temperature has been reached. If not, then the routine 400 returns to operation 414 and continues to monitor the fuel cell electrolyzer stack 102 temperature.

However, if the lower threshold temperature has been reached, then the routine 400 continues to operation 418, where the controller 120 increases the voltage 106 to a value above that of the thermal neutral voltage 302. Again, the value may correspond to a voltage 106 that will enable the temperature of the fuel cell electrolyzer stack 102 to reach the upper threshold temperature according to the desired cycle time.

The routine continues from operation 418 to operation 420, until the electrolysis process is complete. The electrolysis process may be complete according to a predetermined operational duration, upon the shutdown of one or more associated systems, or when there is insufficient voltage 106 to maintain stable operation of the high temperature electrolyzer system 100. If the electrolysis process is not complete, then the routine 400 returns to operation 408 and continues as described above. If the electrolysis process is complete, then the routine 400 ends.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for controlling an electrolysis process in an electrolyzer cell capable of operating in both exothermic mode and endothermic mode, the method comprising:
   monitoring a temperature of the electrolyzer cell;
   when the temperature reaches a predetermined upper temperature threshold, operating the electrolyzer cell in endothermic mode by decreasing a voltage to the electrolyzer cell below a thermal neutral voltage; and
   when the temperature drops to a predetermined lower temperature threshold, operating the electrolyzer cell in exothermic mode by increasing the voltage to the electrolyzer cell above the thermal neutral voltage.

2. The method of claim 1, further comprising controlling a reactant flow to the electrolyzer cell based on the voltage applied to the electrolyzer.

3. The method of claim 1, wherein the voltage originates from a renewable energy source.

4. The method of claim 1, further comprising determining the thermal neutral voltage of the electrolyzer cell by determining a voltage at which the electrolysis process switches from endothermic mode to exothermic mode according to a plurality of operational characteristics of the electrolyzer cell.

5. The method of claim 4, wherein the plurality of operational characteristics comprises operating environment temperature, reactant characteristics, and electrolyzer cell size.

6. The method of claim 1, further comprising repeating an operation cycle for a duration of the electrolysis process, wherein the operation cycle is defined by operating the electrolyzer cell from the predetermined upper temperature threshold to the lower temperature threshold and back to the upper temperature threshold.

7. The method of claim 6, wherein a mean voltage during the operation cycle comprises approximately the thermal neutral voltage.

8. The method of claim 1, further comprising applying heat generated by the electrolyzer cell when operating in the exothermic mode to the electrolyzer cell when operating in the endothermic mode.

9. The method of claim 1, further comprising:
   storing a hydrogen product of the electrolysis process;
   providing the hydrogen product to the electrolyzer cell; and combining the hydrogen product with oxygen within the electrolyzer cell such that the electrolyzer cell operates as a fuel cell to create electricity.

10. The method of claim 9, further comprising:
controlling a production rate or a consumption rate of oxygen and controlling a backpressure of the oxygen to maintain a desired pressure differential across the electrolyzer cell.

11. The method of claim 1, wherein the electrolyzer cell comprises a high-temperature solid oxide electrolyzer.

12. A method for controlling an electrolysis process in an electrolyzer cell, the method comprising:
controlling an operational voltage of the electrolyzer cell at a value higher than a thermal neutral voltage of the electrolyzer cell;
providing a reactant to the electrolyzer cell to initiate the electrolysis process;
determining that a temperature of the electrolyzer cell comprises an upper threshold temperature;
in response to determining that the temperature comprises the upper threshold temperature, reducing the operational voltage of the electrolyzer cell to a value that is lower than the thermal neutral voltage of the electrolyzer cell and applying waste heat from the electrolysis process to the electrolyzer cell;
determining that the temperature of the electrolyzer cell comprises a lower threshold temperature; and
in response to determining that the temperature comprises the lower threshold temperature, increasing the operational voltage of the electrolyzer cell to a value that is higher than the thermal neutral voltage of the electrolyzer cell.

13. The method of claim 12, further comprising:
determining that the temperature of the electrolyzer cell comprises the higher threshold temperature to complete an operational cycle; and
in response to completion of the operational cycle, controlling the value of the operational voltage to continuously repeat the operational cycle for a desired operational duration of the electrolysis process.

14. The method of claim 13, wherein the operational voltage originates from a solar energy source and comprises excess voltage not used to operate a system, and wherein the desired operational duration comprises a duration defined by the presence of the excess voltage.

15. The method of claim 13, wherein controlling the value of the operational voltage to continuously repeat the operational cycle for the desired operational duration of the electrolysis process comprises alternating between exothermic mode and endothermic mode such that hydrogen is produced by the electrolysis process for the desired operational duration without utilizing a thermal management system for removal of the waste heat produced by the electrolysis process.

16. The method of claim 12, wherein the mean of the value of the operational voltage that is lower than the thermal neutral voltage and the value of the operational voltage that is higher than the thermal neutral voltage comprises approximately a value corresponding to the thermal neutral voltage.

17. The method of claim 12, further comprising:
storing a hydrogen product of the electrolysis process;
dissipating an oxygen product of the electrolysis process to ambient air;
providing the hydrogen product to the electrolyzer cell; and
combining the hydrogen product with oxygen within the electrolyzer cell such that the electrolyzer cell operates as a fuel cell to create electricity.

18. A thermal control system for managing heat within an electrolyzer capable of operating in both exothermic mode and endothermic mode, the thermal control system comprising:
a temperature sensor operative to detect an operating temperature of the electrolyzer; and
a controller operative to
control an operational voltage to the electrolyzer,
monitor the operating temperature of the electrolyzer via the temperature sensor,
when the operating temperature of the electrolyzer satisfies a predetermined upper temperature threshold, decrease the operational voltage to a value less than a thermal neutral voltage of the electrolyzer, and
when the operating temperature of the electrolyzer satisfies a predetermined lower temperature threshold, increase the operational voltage to a value greater than the thermal neutral voltage of the electrolyzer.

19. The thermal control system of claim 18, wherein the electrolyzer comprises a solid oxide electrolyzer and wherein the operational voltage originates from a renewable energy source.

20. The thermal control system of claim 18, wherein the controller is further operative to control the flow of a reactant to the high temperature electrolyzer according to the operational voltage applied.

* * * * *